United States Patent
Kosmach

[19]

[11] Patent Number: 6,006,459
[45] Date of Patent: Dec. 28, 1999

[54] VEHICLE LICENSE PLATE COVER

[76] Inventor: Jerry C. Kosmach, 21030 Wilmore Ave., Euclid, Ohio 44123

[21] Appl. No.: 08/978,091

[22] Filed: Nov. 25, 1997

[51] Int. Cl.$^6$ ..................................................... G09F 7/00
[52] U.S. Cl. .................................. 40/200; 40/205; 40/661
[58] Field of Search .............................. 40/209, 200, 205, 40/661, 661.08, 738, 737, 757

[56] References Cited

U.S. PATENT DOCUMENTS

| D. 313,787 | 1/1991 | Williams | D12/193 |
|---|---|---|---|
| 1,742,378 | 1/1930 | Boese | 40/738 |
| 2,156,753 | 5/1939 | Durnam et al. | 40/205 X |
| 2,807,899 | 10/1957 | Adams | 40/209 X |
| 3,316,052 | 4/1967 | Ross | 40/757 X |
| 4,270,288 | 6/1981 | Sulzer | 40/661 X |
| 4,295,288 | 10/1981 | Westberg | 40/661 |
| 4,545,140 | 10/1985 | Winston | 40/661 |
| 5,228,223 | 7/1993 | Lan | 40/205 |
| 5,619,816 | 4/1997 | Ellison | 40/738 |
| 5,819,449 | 10/1998 | Molson | 40/200 |
| 5,875,575 | 3/1999 | Pember | 40/200 |

Primary Examiner—Terry Lee Melius
Assistant Examiner—Robert G. Santos
Attorney, Agent, or Firm—John F. McDevitt

[57] ABSTRACT

A transparent vehicle license plate cover member having an outwardly projecting curved shape is described exhibiting distinctive performance advantages when mounted on the vehicle. The mounted cover enhances aerodynamic operation of the vehicle while reducing glare when viewing the covered license plate.

2 Claims, 2 Drawing Sheets

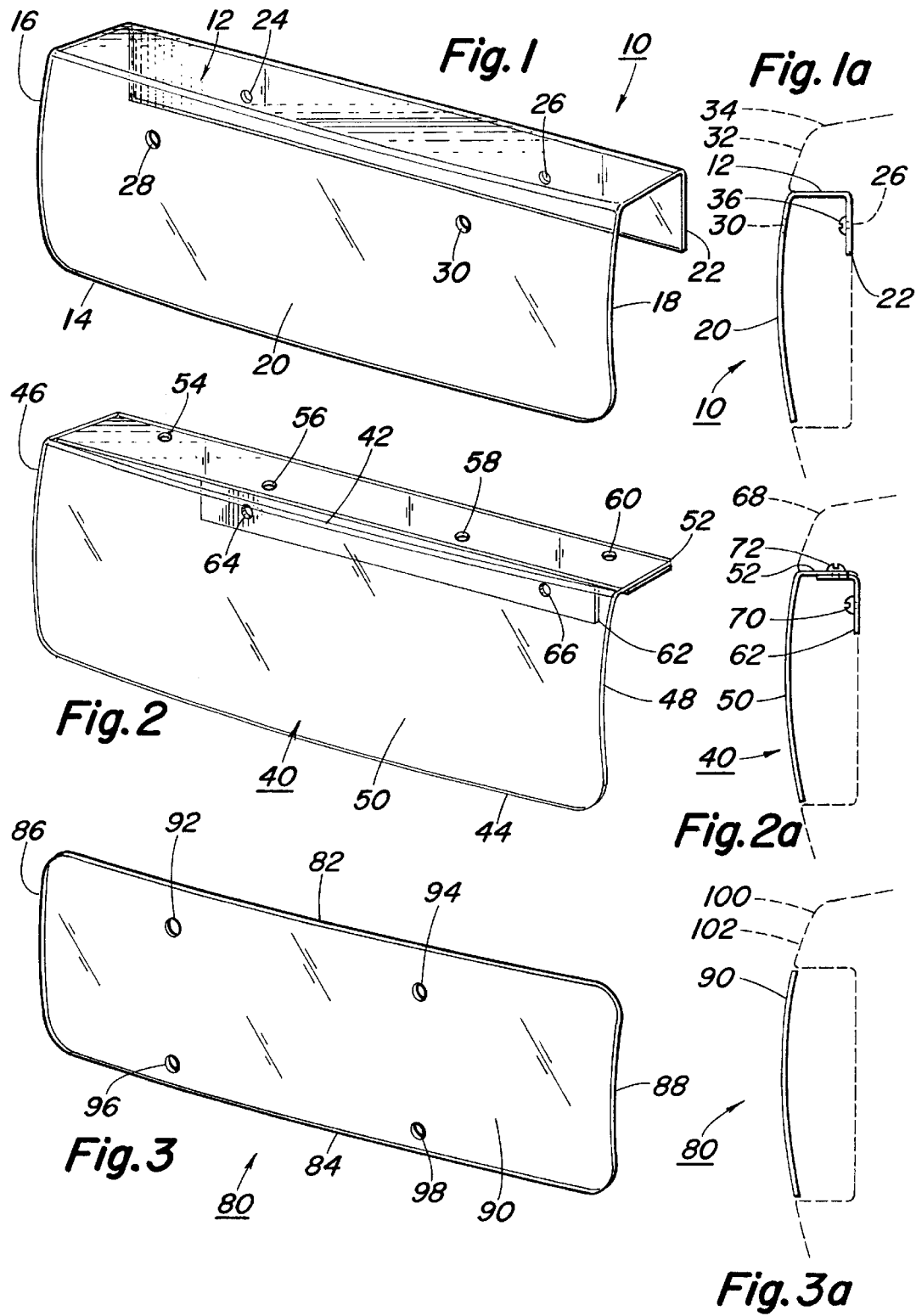

VEHICLE LICENSE PLATE COVER

BACKGROUND OF THE INVENTION

The present invention generally relates to a transparent protective cover member for a vehicle license plate and more particularly to a novel construction for such cover member exhibiting distinctive performance advantages when mounted on the vehicle.

Commonly employed vehicle license plate covers enabling visual observation of the license plate disposed thereunder are now constructed having a generally rectangular physical configuration and with each major surface residing in a single flat plane. Such cover members can be formed with various visually transparent materials such as glass compositions or synthetic organic polymers to permit quick identification of the underlying license plate as required under existing motor vehicle laws. A wide assortment of such flat face cover members has also long been known frequently involving a rather complex physical construction as well as requiring multiple diverse component parts. For example, U.S. Pat. No. 2,807,899 discloses a license cover assembly comprising a transparent housing member enclosing the license plate with both front and rear flat faces. A still more recently issued U.S. Pat. No. 4,956,930 discloses a license cover assembly employing a plurality of movable transparent flat planar vanes which when closed (see FIG. 6) completely overlies the license plate disposed thereunder while still permitting its visual observation. In still more recently issued U.S. Pat. No. 313,787 there is disclosed a presumably transparent vehicle license plate cover member mounted in a peripherally oriented frame which has an outwardly projecting curved shape joined to the protruding flat side faces.

All of said prior art protective license cover means exhibit significant performance drawbacks for a moving vehicle. The current emphasis in automotive vehicle design to focus on aerodynamic considerations has caused the exterior frame or body of the vehicle to become streamlined in order to reduce drag when the vehicle is in motion. Accordingly, having the cover member itself or parts of the cover assembly project outwardly from the exterior vehicle body can produce undue air turbulence and thereby reduce aerodynamic performance of the vehicle. From a dissimilar consideration, the visual observation of a vehicle license plate when enclosed by a cover member having flat major surfaces can become subject to considerable glare from the light being reflected back off these cover surfaces. Since the existing motor vehicle laws require vehicle identification to be maintained both day and night whenever vehicles are traveling on public highways, any excessive glare being emitted from the prior art license plate cover members could actually prevent compliance with these laws. Modification of the existing protective cover means to significantly reduce or virtually eliminate both of these drawbacks still remains a desirable objective.

It is one object of the present invention, therefore, to provide novel vehicle license plate cover means enhancing aerodynamic operation of the vehicle while also reducing glare when viewing the covered license plate.

It is another object of the present invention to provide such novel vehicle license plate cover means having a single member unitary construction.

Still another object of the present invention is to provide a novel vehicle license plate cover assembly employing the present cover member for combination with mounting means secured to the vehicle body.

These and still further objects of the present invention will become apparent upon considering the following more detailed description of the present invention.

SUMMARY OF THE INVENTION

Novel vehicle license plate cover means have now been discovered utilizing a single piece transparent cover member formed in a particular outwardly projecting curved shape generally conforming to the shape of the vehicle body at the license plate location. More particularly, the curved shape of said cover member is of a compound nature curving outwardly from the license plate disposed thereunder in both vertical and horizontal directions so as to closely approximate the particular vehicle body shape where attached. Such construction of the present cover member when attached to the vehicle enhances air flow past the cover member during vehicle motion while further reducing glare when viewing the covered license plate. Transparency of the present cover member can be achieved with clear or tinted conventional materials such as glass, synthetic organic polymers and the like while forming such materials into the desired curved shape for a particular vehicle body style can also be carried out in a conventional manner to include molding, forming, etc. Attaching the present cover member to either the front end or the back end of a vehicle is made possible in various ways to be more fully described hereinafter.

The general physical configuration of the present cover member is rectangular being defined by interconnected top, bottom and opposing sides. In certain embodiments, attachment of the cover member to the vehicle body is enabled with rearwardly projecting flange means forming the top side of the cover member. In a different embodiment, openings or holes are provided in the curved major surfaces of the cover member enabling rearwardly projecting conventional fastening means to be inserted for its attachment to the exterior frame of the vehicle body. The novel license plate cover assembly employing the present cover member can still further include associated bracket means to physically secure the cover member to the exterior vehicle frame as will be further described in connection with the accompanying drawings.

BRIEF DESCRIPTION OF THE DRAWINGS

FIG. 1 is a front perspective view depicting a representative embodiment of the present cover member.

FIG. 1a is a side elevation view depicting the cover member of FIG. 1 after attachment to a rear end panel for a typical automotive vehicle.

FIG. 2 is a front perspective view depicting a different representative embodiment of the present cover member.

FIG. 2a is a side elevation view depicting the cover member of FIG. 2 after attachment to a rear end panel for a typical automotive vehicle.

FIG. 3 is a front perspective view depicting still a different representative embodiment of the present cover member.

FIG. 3a is a side elevation view of the FIG. 3 cover member depicting its joinder to a rear panel of a typical automotive vehicle.

DETAILED DESCRIPTION OF THE PREFERRED EMBODIMENTS

Figure 4:
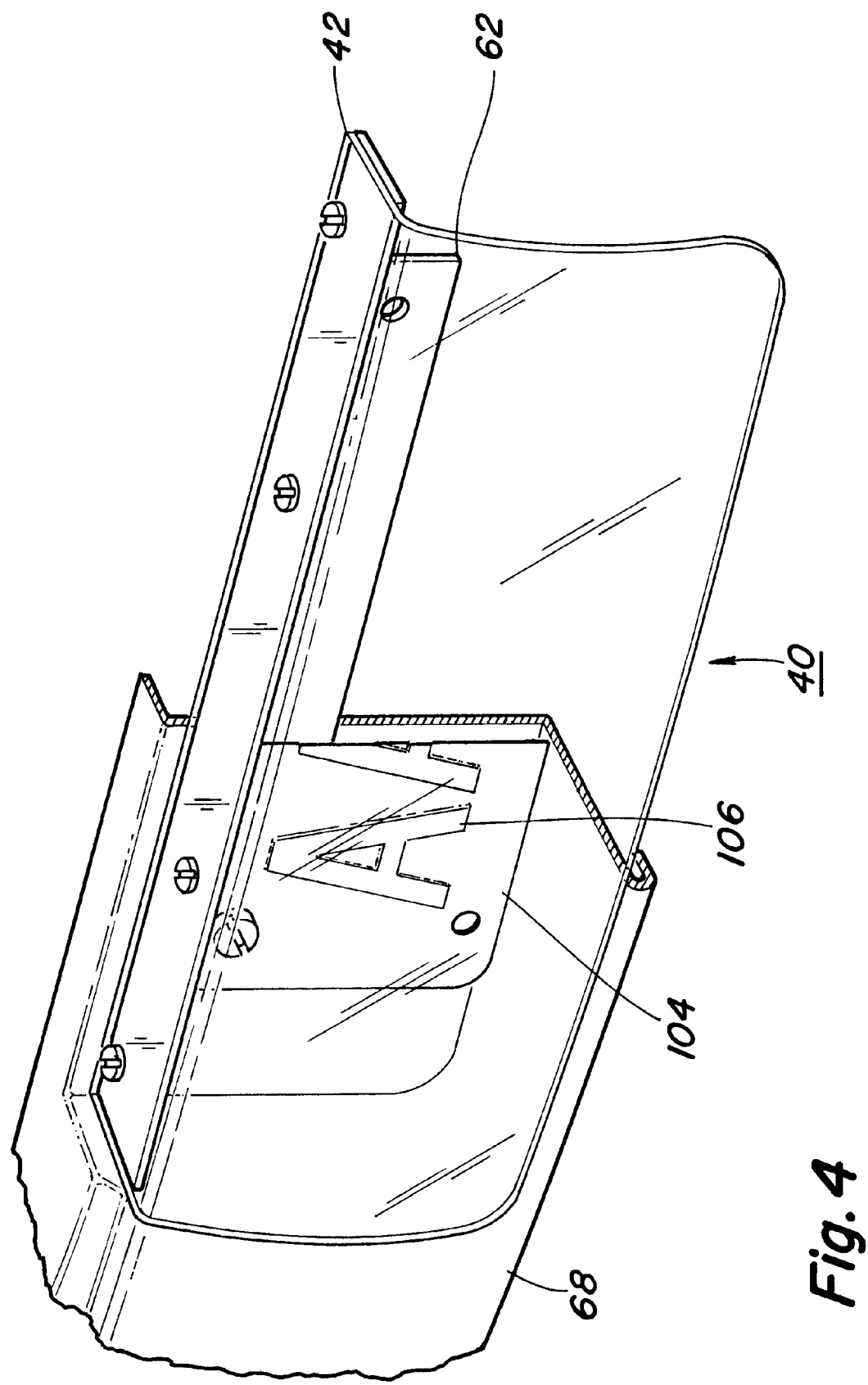
FIG. 4 is fragmentary perspective view further depicting the manner of joining the FIG. 2 cover member to the vehicle body as a final assembly.

Referring to the drawings, FIG. 1 depicts a representative vehicle license plate cover of the present invention 10 having top, bottom and opposing sides 12, 14, 16 and 18, respectively, which are interconnected to form a generally rectangular physical configuration. The cover member 10 further includes an outwardly projecting curved face 20 extending in both vertical and horizontal directions. Top side 12 of said cover member projects rearwardly from the curved cover face 20 while further terminating in a downward projecting lip 22 for subsequent physical joinder to a suitable vehicle body panel (not shown). Lip 22 of the cover member includes a pair of openings 24 and 26 for assembly of the cover member to said vehicle panel with conventional fasteners while further openings 28 and 30 located in the curved face 20 of said cover member enable tool insertion when securing or removing the cover member as desired.

FIG. 1a is a side elevation view depicting physical attachment of the FIG. 1 cover member to a rear panel of the vehicle body. Accordingly, the same numerals have been retained in the present drawing to identify common component parts of the cover member 10. As can be first observed in the present drawing, there exists a close correspondence in curvature between the curved face 20 of said cover member and the curved shape 32 of the rear vehicle panel 34. The curvature of the affixed cover member further closely matches that of said rear vehicle panel in both vertical and horizontal directions. Affixing said cover member 10 to the vehicle is completed with conventional fastening elements 36, such as metal screws and the like, simply being inserted into the rear openings (24 and 26) of said cover member for joinder to rear vehicle panel 34 as shown. It can also be appreciated from the foregoing description that cover member 10 is equally suitable for joinder to the front license plate of the illustrated vehicle, such as that commonly located in the front bumper area.

FIG. 2 is a front perspective view depicting a different representative embodiment of the present cover member. Said cover member 40 again has a rectangular configuration with interconnected top, bottom and opposing sides 42, 44, 46 and 48, respectively, while further including an outwardly projecting curved face 50 extending in both vertical and horizontal directions. Top side 42 of said cover member also projects rearwardly but now terminates in a horizontally oriented flange extension 52. Openings 54, 56, 58 and 60 are provided in said flange portion of the cover member for its subsequent joinder to a support bracket 62 associated therewith employing conventional fastening means (not shown). In so doing, said support bracket 62 is affixed to the vehicle body at the license plate location with cover member 40 being subsequently attached thereto again employing said conventional fastening means being inserted into the aforementioned openings. The support bracket 62 is secured to the vehicle body at openings 64 and 66. Side elevation view 2a of the present drawings further depicts final assembly of cover member 40 in such manner. As can be seen, support bracket 62 is physically attached to rear panel member 68 by conventional fastening means 70 with cover member 40 then being affixed to said support bracket employing the same or similar fastening means 72. There is again provided in said cover member a close correspondence in curvature with the particular vehicle body shape where said cover member has been located.

FIG. 3 is a front perspective view depicting still a different representative embodiment of the present cover member. Cover member 80 is similar in configuration to the previously described cover member embodiments with top, bottom and opposing sides 82, 84, 86 and 88, respectively, forming a rectangular outline to include outwardly projecting curved face 90. Multiple openings 92, 94, 96 and 98 are provided in the curved face 90 of said cover member to enable joinder of said cover member to the vehicle body when rearwardly projecting fastening elements are inserted into these openings. FIG. 3a represents a side elevation view depicting general orientation of the present cover member embodiment after being affixed to a particular vehicle body panel 100. As is again evident from said final vehicle license plate assembly, a close correspondence in curvature exists between the curved face 90 of said cover member and the curved shape 102 of the rear vehicle panel 100.

FIG. 4 is a fragmentary perspective view further depicting the manner of joining the FIG. 2 cover member embodiment to the vehicle body as a final assembly. Accordingly, the same numerals employed in FIG. 2 have again been retained in the present drawing for identification of the same features. Cover member 40 overlies a vehicle license plate 104 bearing identification indicia 106 on the front face thereof. Said license plate is affixed to rear panel 68 of the vehicle body (not shown) with support bracket 62 also being affixed thereto as previously described in FIG. 2a. Physically securing the top side 42 of said cover member to support bracket 62 in the manner also previously described in FIG. 2a completes formation of the herein illustrated license plate cover assembly. A visual inspection of the completed assembly demonstrates that the installed cover member now serves to block the cavity ordinarily found at such vehicle license plate locations and which contributes to producing undesirable air turbulence when the vehicle is in motion.

It will be apparent from the foregoing description that broadly useful and novel vehicle license plate covering means has been provided demonstrating distinctive performance advantages. It is contemplated that modifications can be made in construction of the herein described cover member other than above specifically illustrated. For example, other physical configurations than a rectangular configuration are contemplated to accommodate various other shapes for a vehicle license plate. Likewise, it is contemplated that the herein described cover member can be affixed at vehicle license plate locations by means other than utilizing conventional fastener elements. Consequently, it is intended to limit the present invention only by the scope of the appended claims.

What I claim as new and desire to secure by Letters Patent of the United States is:

1. A transparent vehicle license plate cover assembly comprising in combination:
    (a) a flat vehicle license plate having identification indicia on the front face thereof,
    (b) a transparent license plate cover member overlying said license plate, said license plate cover member having a generally rectangular physical configuration defined by interconnected top, bottom and opposing sides, said license plate cover member further having an outwardly projecting curved shape with respect to the license plate disposed thereunder and with said curved shape generally conforming to the shape of the vehicle body at the license plate location so as to enhance air flow past said license plate cover member during vehicle motion while further reducing glare when viewing the covered license plate,
    (c) the top side of said license plate cover member further including rearwardly projecting flange means, and
    (d) fastening means extending from said license plate cover member to enable its physical attachment to the vehicle body.

2. A transparent vehicle license plate cover assembly in combination:

(a) a flat vehicle license plate having identification indicia on the front face thereof;

(b) a transparent synthetic organic polymer license plate cover member overlying said license plate, said license plate cover member having a generally rectangular physical configuration defined by interconnected top, bottom and opposing sides, said license plate cover member further having an outwardly projecting curved shape with respect to the license plate disposed thereunder, and with said curved shape including curvature in both vertical and horizontal directions conforming to the shape of the vehicle body at the license plate location so as to enhance air flow past said license plate cover member during vehicle motion while further reducing glare when viewing the covered license plate, (c) the top side of said license plate cover member further including rearwardly projecting flange means, and (d) fastening means extending from said license plate cover member to enable its physical attachment to the vehicle body, said fastening means including fastening elements projecting rearwardly through openings in the license plate cover member.

* * * * *